United States Patent Office 3,002,023
Patented Sept. 26, 1961

3,002,023
PRODUCTION OF ALPHA, BETA-UNSATURATED ACYL COMPOUNDS
Hans Fikentscher and Hans Wilhelm, Ludwigshafen, (Rhine), Germany, assignors to Badische Anilin- & Soda-Fabrik Aktiengesellschaft, Ludwigshafen (Rhine), Germany
No Drawing. Filed Feb. 10, 1958, Ser. No. 714,027
Claims priority, application Germany Feb. 13, 1957
4 Claims. (Cl. 260—561)

This invention relates to the conversion of ketone cyanhydrins into alpha, beta-unsaturated acyl compounds, more specifically acid amides, by a reaction of the following scheme:

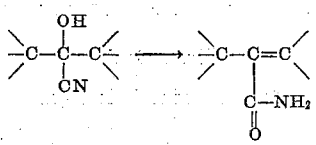

It is already known that unsaturated carboxylic acid amides form from ketone cyanhydrins when they are heated in the presence of sulfuric acid, oleum or alkyl-sulfuric acids. For example methacrylamide can be prepared from acetone cyanhydrin in accordance with the following scheme:

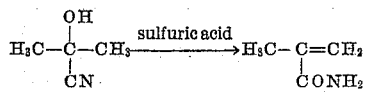

Mixtures of unsaturated carboxylic acid amides with sulfuric acid obtained in this way can be converted by the addition of water into unsaturated carboxylic acids or by the addition of alcohols into esters of unsaturated carboxylic acids.

The yield of the said unsaturated compounds depends, apart from the constitution of the initial materials, on the height of the temperature and the reaction time. For the production of methacrylamide from a mixture of acetone cyanhydrin and sulfuric acid, for example the teaching is to heat the mixture to a temperature not above 140° C. and to put up with prolonged reaction periods instead in order that decompositions are prevented. The extended heating periods (for example one hour is necessary at 140° C. and about two hours at 120° C.) however favor the formation of dark colored impurities in a marked degree with the result that losses of yield occur and special purification measures are required to give the end products the desired degree of purity. The fact is that the dark colored byproducts interfere with a subsequent polymerisation or copolymerisation of the end products in the production of polymers therefrom. Moreover, apart from effecting an undesirable dark coloration in the polymers, the byproducts also worsen their other properties, for example they greatly diminish the K-value of the polymers. The said prior art technique has the further shortcoming that the reaction mixture has to stay in the reaction zone for a long time and that this long "residence time" makes a continuous operation very difficult or even impossible.

According to another proposal, the "residence time" can be appreciably cut down in the conversion of acetone cyanhydrin into methacrylamide by further raising the reaction temperature, for example to 150° C. or more. In this case it is the high temperatures which lead to decompositions and therefore to very dark colored end products, in spite of the shorter "residence time." A particular disadvantage of this process is that under temperatures as high as this the reaction plant is subject to strong corrosion. Any saving in time must therefore be paid for by a considerably shortened life of the apparatus.

It is the object of our invention to convert ketone cyanhydrins into alpha, beta-unsaturated acyl compounds, especially alpha, beta-unsaturated carboxylic acid amides under milder reaction conditions than were heretofore used, i.e. lower reaction temperatures and/or shorter reaction times.

Another object of our invention is to minimize the amount of byproducts ordinarily obtained in the formation of alpha, beta-unsaturated acyl compounds from ketone cyanhydrins.

In accordance with our invention the said objects are effected by practicing the conversion of ketone cyanhydrins into alpha, beta-unsaturated acryl compounds in the presence of the conventional reaction agents and, additionally, in the presence of salts of phosphoric acid or/and of sulfuric acid.

The reaction agent primarily used is strong sulfuric acid, i.e. sulfuric acid of at least 95 percent strength. In the practice of our invention sulfuric acid of at least 97 percent strength is preferred. Fuming sulfuric acid, i.e. a solution of sulfuric anhydride in 100 percent sulfuric acid, and alkyl-sulfuric acids can also be used as reaction agents. Strong sulfuric acid and fuming sulfuric acid with about 4 percent of sulfuric anhydride are preferred for economic reasons, as they are readily available. Most satisfactory results are obtained with 100 percent sulfuric acid.

The salts of a phosphoric acid are meant to include, for example, the salts of orthophosphoric acid, metaphosphoric acid, pyrophosphoric acid and polyphosphoric acids. Suitable metals for the salt formation are, for example, alkali metals, alkaline earth metals, metals of the 1st sub-group or the 3rd group of the periodic system. The salts of the said metals with sulfuric acid and pyrosulfuric acid can also be used in the practice of our invention. As examples there may be mentioned sodium or potassium metaphosphate, primary, secondary or tertiary sodium or potassium phosphate, sodium or potassium pyrophosphate, copper phosphate, aluminum phosphate, sodium hexametaphosphate, sodium or potassium sulfate, sodium or potassium bisulfate, sodium or potassium pyrosulfate, mixtures of these salts or mixtures of salts of different metals. The alkali salts of the said acids are especially preferred.

In the preparation of the reaction mixture of ketone cyanhydrin and sulfuric acid, fuming sulfuric acid or alkylsulfuric acid, the usual relative proportions can be chosen. In general for 1 mol of ketone cyanhydrin there are used 1 to 4 mols of, for example, sulfuric acid. The molar ratio advantageously used is from 1:1.5 to 1:4. This molar ratio, if acetone cyanhydrin and sulfuric acid of 100% strength are used, corresponds to a ratio by weight of 1:1.73 to 1:4.6. The amount of salts of phosphoric acids and of the sulfuric acids may be about 0.5 to 10% by weight with reference to the amount of sulfuric acid which is used as the basic reaction charge. The salts of phosphoric acids or of sulfuric acids may be dissolved or suspended in the mixture of ketone cyanhydrin and, for example, sulfuric acid, but it is preferable to add the salts of phosphoric acids or the salts of sulfuric acids to the basic reaction charge, i.e. sulfuric acid, fuming sulfuric acid or alkylsulfuric acids before the mixing of the same with the ketone cyanhydrin. Obviously the said metal salts may also be produced within the sulfuric acid or the mixture of sulfuric and phosphoric acid provided for the preparation of the unsaturated acyl compounds, by reacting the acid with compounds of the metals in the corresponding amounts.

Ketone cyanhydrins which can be converted into alpha, beta-unsaturated carboxylic acid amides or caroxylic acids or esters by the said process are obtained, for example, by adding on hydrogen cyanide to a ketone of the formula

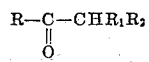

In this formula R represents an organic radical, $R_1$ and $R_2$ an organic radical, hydrogen or halogen. $R_1$ and $R_2$ may be identical or different. The organic radicals represented by R, $R_1$ and $R_2$ may be, for example, alkyl groups, such as methyl, ethyl, propyl, isopropyl, or also branched or straight-chain higher alkyl radicals, or aralkyl radicals. The type of ketone cyanhydrins preferred in the practice of our invention are those derived from ketones in which R— and —$CHR_1R_2$ are aliphatic radicals. Ketone cyanhydrins which have been obtained by adding on hydrogen cyanide to cyclic ketones may also be used with advantage as initial material for the new process. It is obvious that the practicableness of the present process according to our invention is not dependent on the manner in which the ketone cyanhydrin has been prepared, so that ketone cyanhydrins which have been obtained in any other way can also be used as initial material in the same way. Since by heating ketone cyanhydrins in sulfuric acid unsaturated carboxylic acid amides are primarily formed, this process is especially well suited for the production of the amides. The reaction may however also be carried beyond the carboxylic acid amide stage by saponification or by esterification. In the production of these unsaturated compounds, for example of methacrylic acid, methylcrotonic acid, methacrylic acid esters or other unsaturated esters, the new process also represents a considerable advance.

It is surprising that the presence of salts of phosphoric acids or of sulfuric acids should make the reaction of ketone cyanhydrins to unsaturated carboxylic acid amides possible within a shorter "residence time" at lower temperatures and that undesirable byproducts, in contrast to the processes hitherto known, should be formed only in very small amounts. For example, with a content of 3.2% of sodium metaphosphate in the mixture of acetone cyanhydrin and sulfuric acid (percentage with reference to the said mixture) there is obtained within 60 seconds at 125° C. a 95% conversion into very pure methacrylamide which is only colored to a very slight extent. In the usual working up, the salts of phosphoric or sulfuric acids are completely removed so that these additions do not require any special measures for their separation.

Although, for example, acetone cyanhydrin can be reacted according to this new process to methacrylamide even in the temperature range of 120° to 140° C. within from one second to a few minutes with satisfactory yields, the invention is not limited to this range of temperatures because the optimum reaction temperature also depends on the ketone cyanhydrin used.

In every single case however it is possible by adding the said salts to maintain lower temperatures than hitherto with considerably shorter "residence times" and therefore less strenuous conditions. If it is merely desired to increase the throughput per unit of time, shorter "residence times" can be used at the temperatures hitherto usual.

In all cases there is the advantage of saving in energy, of reduction in corrosion and of purer end products without diminution in yield.

The following examples will further illustrate this invention but the invention is not restricted to these examples. The parts specified in the examples are parts by weight.

*Example 1*

25 parts of technical grade acetone cyanhydrin of 95.8% strength are mixed at a temperature of 95° to 105° C. with 50 parts of 100% sulfuric acid into which 2.5 parts of sodium metaphosphate have previously been stirred. This mixture is allowed to flow through a heated coil which has a temperature of 125° C. at its outlet. The "residence time" inside the coil amounts to 150 seconds. The acetone cyanhydrin is converted to the extent of 94.5% into methacrylamide.

If this mixture is worked up for example by neutralization with ammonia water, there are obtained from the precipitate thereby formed, without regard to the filtrate after filtration by suction, drying and a single extraction of the salt, for example with chloroform, 20.65 parts of a practically colorless methacrylamide with a hydrogenation iodine number of 299 after evaporation of the same. It shows the infra-red spectrum of pure methacrylamide.

*Example 2*

A mixture of 25 parts of technical grade acetone cyanhydrin of 95.8% strength, 50 parts of 100% sulfuric acid and 2.5 parts of sodium metaphosphate is heated within 210 seconds from 70° to 125° C. and immediately cooled upon reaching this temperature. The acetone cyanhydrin has been converted into methacrylamide to the extent of 95%.

*Example 3*

A mixture of 25 parts of technical grade acetone cyanhydrin of 97.1% strength, 50 parts of 100% sulfuric acid and 2 parts of copper phosphate is heated within 210 seconds from 70° to 125° C. and immediately cooled upon reaching this temperature. The acetone cyanhydrin is converted into methacrylamide to the extent of 93.5%.

*Example 4*

A mixture of 25 parts of technical grade acetone cyanhydrin of 97.1% strength, 50 parts of sulfuric acid and 2.5 parts of sodium hexametaphosphate is heated within 200 seconds from 70° to 80° C. to 135° C. and immediately cooled upon reaching this temperature. The acetone cyanhydrin is thereby converted to the extent of 94% into methacrylamide.

*Example 5*

The procedure of Example 4 is followed with the replacement of the sodium hexametaphosphate by 2.5 parts of sodium pyrophosphate. The acetone cyanhydrin is converted into methacryamide to the extent of 94%.

*Example 6*

A mixture of 25 parts of methyl ethyl ketone cyanhydrin, 50 parts of sulfuric acid and 2.5 parts of sodium metaphosphate is heated to 140° C. for 150 seconds. The methyl ethyl ketone cyanhydrin is converted into methacrylamide to the extent of 87%.

*Example 7*

A mixture of 25 parts of cyclohexanone cyanhydrin, 50 parts of sulfuric acid and 3 parts of sodium hexametaphosphate is kept at 150° C. for 120 seconds. The conversion into cyclohexene carboxylic acid amide amounts to 78%.

*Example 8*

25 parts of technical grade acetone cyanhydrin of 95.8% strength with a water content of 1.6% and 50 parts of 3.6% oleum, to which 2.5 parts of anhydrous sodium sulfate have been added are mixed at 70° to 80° C. and heated to 125° C. within 200 seconds. After a "residence time" of 300 seconds at the said temperature the mixture is rapidly cooled. The acetone cyanhydrin is thereby converted into methacrylamide to the extent of 94.5%.

If this conversion mixture is neutralized with aqueous ammonia, there is obtained directly from the precipitate thereby formed, without regard to the filtrate, after extraction with chloroform and evaporation, a practically pure methacrylamide with the hydrogenation iodine number 299 without further recrystallization.

Instead of sulfate also pyrosulfate or bisulfate may be used.

Example 9

A mixture of 25 parts of technical grade acetone cyanhydrin of 95.8% strength, 50 parts of 100% sulfuric acid and 0.5 part of sodium metaphosphate is heated to 125° C. for 10 minutes and then cooled. 93.0% of the acetone cyanhydrin are converted into methacrylamide.

Example 10

A mixture of 25 parts of technical grade acetone cyanhydrin of 95.8% strength, 100 parts of sulfuric acid and 2.5 parts of sodium metaphosphate is heated from 70° C. to 125° C. within 90 seconds and then immediately cooled. 92.0% of the acetone cyanhydrin are converted into methacrylamide.

Example 11

A mixture of 50 parts of technical grade acetone cyanhydrin of 96% strength, 100 parts of sulfuric acid and 0.25 part of sodium hexametaphosphate is heated from 70° C. to 140° C. within 10 minutes and kept at this temperature for 10 minutes. 92% of the acetone cyanhydrin are converted into methacrylamide.

Example 12

A mixture of 50 parts of technical grade acetone cyanhydrin of 95.8% strength, 100 parts of sulfuric acid and 10 parts of sodium hexametaphosphate is heated from 70° C. to 135° C. within 210 seconds and then rapidly cooled. 93% of the acetone cyanhydrin are converted into methacrylamide.

We claim:

1. The method of producing methacrylamide which comprises heating a mixture of acetone cyanhydrin and sulfuric acid to temperatures of from 120° to 140° C. in the presence of an alkali metal salt of an acid selected from the group consisting of an acid of pentavalent phosphorus and an acid of hexavalent sulfur, the ratio of sulfuric acid to the alkali metal salt being 100:0.5 to 100:10 parts by weight and the duration of heating being from 1 second to a few minutes.

2. The method as claimed in claim 1 wherein the molar ratio of the acetone cyanhydrin to the sulfuric acid is from 1:1.5 to 1:4.

3. The method as claimed in claim 1 wherein the alkali metal is sodium.

4. The method as claimed in claim 1 wherein the alkali metal is potassium.

References Cited in the file of this patent

UNITED STATES PATENTS

| | | |
|---|---|---|
| 2,101,822 | Crawford | Dec. 7, 1937 |
| 2,628,977 | Grigsby | Feb. 17, 1953 |
| 2,840,611 | Bikales | June 24, 1958 |

FOREIGN PATENTS

| | | |
|---|---|---|
| 446,908 | Great Britain | May 7, 1936 |

OTHER REFERENCES

Crawford: "Journal Society Chemical Industry" (London), vol. 64, pages 231–233 (1945).